April 15, 1941.                H. W. PAULUS                2,238,130
                                CONCENTRATOR
                          Filed March 2, 1938          2 Sheets-Sheet 2
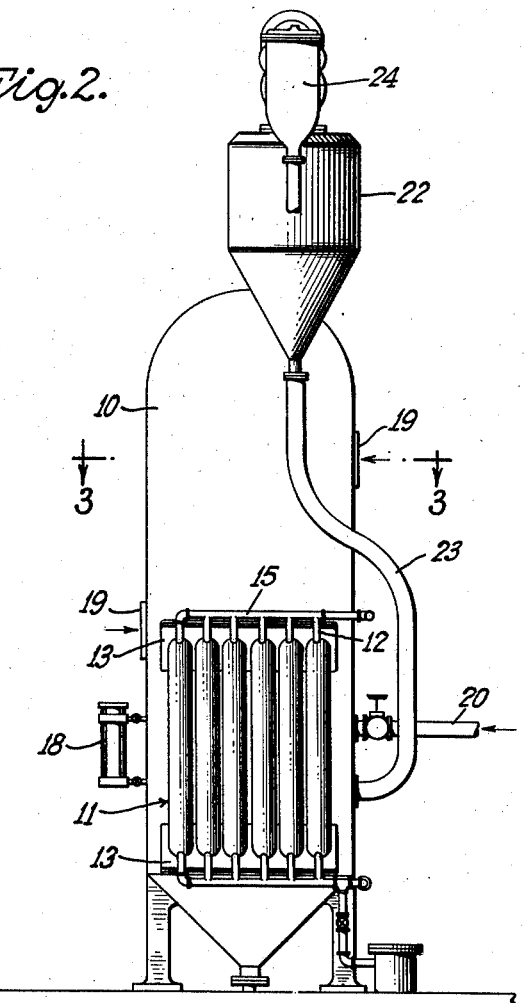
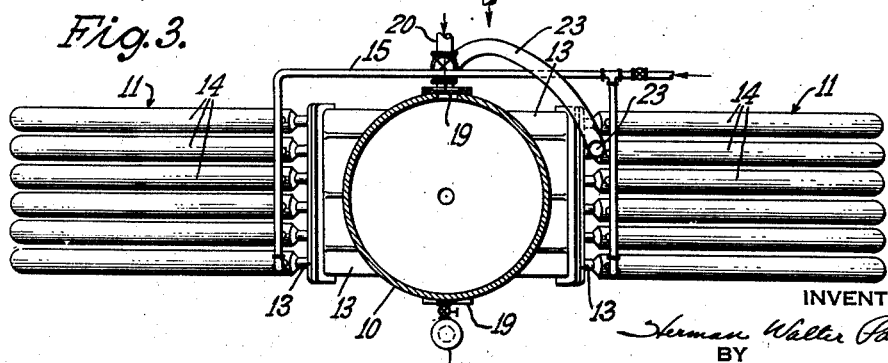

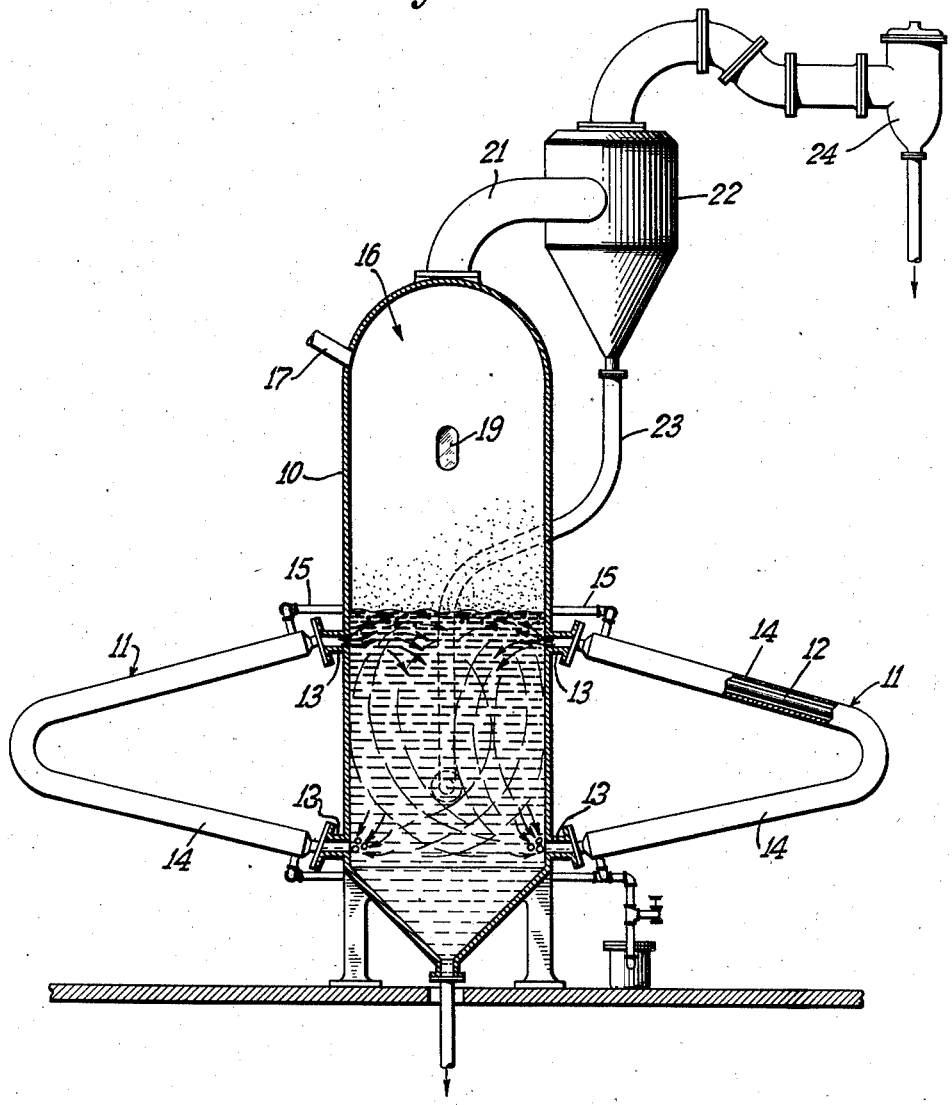

Patented Apr. 15, 1941

2,238,130

UNITED STATES PATENT OFFICE 2,238,130

CONCENTRATOR

Herman Walter Paulus, St. Albans, N. Y., assignor to Standard Brands Incorporated, New York, N. Y., a corporation of Delaware Application March 2, 1938, Serial No. 193,422

4 Claims. (Cl. 159—23)

This invention relates to the treatment of liquids. More particularly, it pertains to a suitable apparatus for the concentration of corrosive and viscous solutions, and includes correlated improvements and discoveries whereby the evaporation of such solutions is enhanced.

Heretofore evaporating apparatus has been bulky and heating has been effected by submerged coils. This manner of heating leads to spasmodic agitation of the evaporator contents, unbalanced relations, spouting and uncontrolled vaporization with consequent loss of solution by entrainment. The size of the conventional apparatus made the cost of a corrosion resistant apparatus practically prohibitive.

General objects of the invention are to overcome these as well as other difficulties and disadvantages, and to provide an apparatus which will rapidly, uniformly and efficiently concentrate corrosive and/or viscous solutions; which will be simple and economical in construction, and which will operate with substantial freedom from wear and mechanical difficulties.

Additional objects of the invention are to provide an apparatus adaptable to the concentration of corrosive and/or viscous solutions in which, a heat exchanger is associated with a concentrator body having inter-communicating connections; flash evaporation is permitted; evaporation proceeds at once after application of a heating medium without delay due to a preliminary heating; a balanced relation will be maintained due to uniform and confined circulation; solutions may be concentrated which are sensitive to prolonged heating; viscous solutions may be concentrated at a high rate of evaporation without appreciable losses by entrainment; rapid circulation of solution permits concentration thereof beyond the saturation point and the formation of crystalline solids, and anhydrous chemicals may be produced in the process of crystal formation in supersaturated solutions.

Other objects of the invention are the provision of a concentrator body which will neither be harmfully affected by nor have any harmful effect upon solutions of a corrosive and viscous nature; in which a mixture of solution and vapors is permitted to enter the body of solution at the surface and substantially at right angles to the flow of escaping vapors; and in which vapors may be readily separated from viscous solutions because of a comparatively thin superincumbent layer.

Still further objects of the invention are the provision of a heat exchanger separate from the concentrator body and in which, only a small portion of solution is momentarily superheated; a predetermined ratio is maintained between the sectional volume of solution and the rate of heat transfer; a uniformly rapid flow of solution is maintained in confined channels thus causing scouring action with prevention of incrustations; vapors are evenly distributed in the solution, and momentary displacement is prevented as well as deposits on the heating surface.

Other objects of the invention will in part be obvious and will in part appear hereinafter.

The invention accordingly comprises the apparatus embodying features of construction, combination of elements and arrangement of parts, all as exemplified in the following detailed disclosure and the scope of the invention which will be indicated in the claims.

For a fuller understanding of the nature and objects of the invention reference should be had to the following detailed description taken in connection with the accompanying drawings, in which;

Fig. 1 is a front elevational view of an illustrative embodiment of an apparatus suitable for practice of the invention, certain parts being shown partially in section and partially broken away;

Fig. 2 is a side elevational view thereof; and

Fig. 3 is a top plan view taken along the lines 3—3 of Fig. 2 and looking in the direction of the arrows and simplified to show especially the heat exchanger.

Referring more particularly to the drawings, there is shown a concentrator body 10 which may be constructed of a chemically inert material, preferably non-metallic, for example, chemical stoneware, glass, porcelain, enamel or rubber lined steel or cast iron, and suitable corrosion resistant metals and alloys.

A heat exchanger 11, of which there may be one or more, comprises a series of inclined tube bends 12, and, being small in comparison with the body 10, may also be of corrosion resistant material as glass, stoneware, enameled iron, acid resisting alloys, noble metals, or a material of low thermal conductivity especially when electrical energy is used by means of submerged electric resistance elements, e. g. electric resistance coils or an induction or resistance furnace. The tubes are attached to lower headers and upper headers 13—13 of the body 10. Each tube is surrounded by a jacket 14 spaced therefrom and terminating short of the headers 13—13. A steam inlet 15 supplies the heat exchanger with a heating medium which may be saturated or super-heated steam, super-heated water (i. e. water at a temperature higher than its boiling point and at a pressure greater than atmospheric), oil, a mineral wax, alcohol, air, gas, or other substance of comparatively high specific heat. The upper portion of the concentrator 16, is a vapor compartment which is preferably evacuated to the desired extent by means of a pump (not shown) through the element 17 and remains so during operation. The concentrator is also equipped with a glass sampler 18, observation ports 19 and feed pipe 20.

Connected in any convenient manner as by a pipe 21 is a catch all or liquid trap 22 which returns to the concentrator by means of pipe 23 any entrained liquid, and the trap in turn is suitably connected to a jet or surface condenser 24.

In operation the apparatus is evacuated as desired, and solution introduced until it rises to a point slightly below normal operating level in order to allow for expansion. The heating medium flows into the heat exchanger 11, where the temperature of the solution is progressively raised which may be until the boiling temperature is reached. Attenuated vapors are liberated at this stage, which intermingle freely with the solution, and thereby lighten the solution column in the tubes 12 in reference to the liquid contained in body 10. This causes an unbalanced relation, and results in an upward flow through the tubes and back into body 10 below the surface level of the solution. Colder solution enters the lower tubes continually and replaces that expelled through the upper tubes. Furthermore, the liberated vapor globules, become more numerous and larger in volume as they ascend the tubes, and force the solution to still greater accelerated motion until an equilibrium is reached, and the performance from that time on is constant.

The mixture of vapor and solution enters the body 10 below the surface level in a thin layer, which permits instant flashing off of vapor. Also it enters substantially at right angles to the general flow of the vapors to the condenser, and thereby entrainment is substantially eliminated. Since the entire separation of the vapors occurs at the solution level, the temperature of the solution is instantly reduced to that equivalent to the vacuum carried in the vapor compartment. As the operation proceeds, all of the solution will pass through the heat exchanger, and be brought to the same temperature which will be not higher than that prevailing on the surface of the solution. Only momentary superheating of a small portion of solution in the heat exchanger takes place, and at a rate that will, in most cases, forestall any objectionable chemical reactions.

In order to accomplish performance of the operating cycle, as above described, in an efficient manner, it is necessary to proportion the tubular cross section of the heat exchanger elements in accordance with the rate of heat transfer. This is desirable in order to obtain the requisite volume of finely intermingled vapor globules, which reduces the specific gravity of the mixture and causes sufficiently rapid upward circulation, both to obtain proper heat transfer and to prevent incrustation of the tubes. Evaporation proceeds directly from cold solutions without an intervening period of preheating.

The apparatus is also well suited for the concentration of viscous liquids, which are usually difficult to evaporate. The greater frictional resistance retains vapors in an evenly divided state in the tubes longer and forces the circulation to even higher velocity. The vapor globules, however, are readily separated at the thin layer in the concentrator.

As exemplifying those substances to which the present invention is applicable mention may be made of the following acids: tartaric, citric, racemic, mesotartaric, glyoxylic, oxalic, malic, maleic, succinic, acetic, sulphuric, hydrochloric; sodium hydroxide, potassium hydroxide, Rochelle salt, potassium bitartrate, gelatine and other protein containing substances, pectins, soaps, sodium chloride, potassium chloride, sodium sulphate and magnesium sulphate.

Since certain changes in the constructions set forth, which embody the invention may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A concentrator comprising in combination a vertical concentrator body of substantially uniform cross section, the lower part being adapted to contain a liquid and the upper part constituting a vapor chamber including an outlet, said lower part being provided with upper and lower headers, a heat exchanger positioned without and in communication with said concentrator body through said headers and consisting of a plurality of tubes running continuously from the lower header to the upper header, and means for heating said tubes.

2. A concentrator comprising in combination a vertical concentrator body of substantially uniform cross section, the lower part being adapted to contain a liquid and the upper part constituting a vapor chamber including an outlet, said lower part being provided with upper and lower headers, a heat exchanger positioned without and in communication with said concentrator body through said headers and consisting of a plurality of tubes running continuously from the lower header to the upper header, and heating means comprising individual jackets about said tubes.

3. A concentrator comprising in combination a vertical concentrator body of substantially uniform cross section, and corrosion resistant, the lower part being adapted to contain a liquid and the upper part constituting a vapor chamber including an outlet, said lower part being provided with upper and lower headers, a heat exchanger positioned without and in communication with said concentrator body through said headers and consisting of a plurality of tubes running continuously from the lower header to the upper header, and means for heating said tubes.

4. A concentrator comprising in combination a vertical concentrator body of substantially uniform cross section and being a ceramic body of integral construction, the lower part being adapted to contain a liquid and the upper part constituting a vapor chamber including an outlet, said lower part being provided with upper and lower headers, a heat exchanger positioned without and in communication with said concentrator body through said headers and consisting of a plurality of tubes running continuously from the lower header to the upper header, and means for heating said tubes.

HERMAN WALTER PAULUS.